United States Patent [19]

Gunzner

[11] Patent Number: 4,462,293
[45] Date of Patent: Jul. 31, 1984

[54] WEAR-RESISTANT AND SHOCK-RESISTANT TOOLS AND METHOD OF MANUFACTURE THEREOF

[76] Inventor: Fred G. Gunzner, 879 W. Main, Silverton, Oreg. 97381

[21] Appl. No.: 423,707

[22] Filed: Sep. 27, 1982

[51] Int. Cl.³ .................. B23D 61/04; B23D 65/00
[52] U.S. Cl. ................................ 83/855; 83/835; 83/698; 76/112; 219/77; 407/118
[58] Field of Search .......... 83/676, 661, 835, 848-855, 83/698; 76/112, 101 R, 101 A, DIG. 11; 228/263.12, 263.19; 219/77, 137 WM; 407/118

[56] References Cited

U.S. PATENT DOCUMENTS

| | | | |
|---|---|---|---|
| 1,733,241 | 10/1929 | Scott | 219/77 X |
| 1,901,654 | 3/1933 | Kerr | 76/101 A |
| 2,683,923 | 7/1954 | Repolgle | 76/112 X |
| 2,833,638 | 5/1958 | Owen | |
| 2,880,768 | 4/1959 | Kolesh | 76/112 |
| 3,034,378 | 5/1962 | Anderson | 219/77 X |
| 3,063,310 | 11/1962 | Connoy | 76/112 |
| 3,104,562 | 9/1963 | Kolesh | 76/112 |
| 3,241,228 | 3/1966 | Rayniak et al. | 76/112 X |
| 3,295,396 | 1/1967 | Kolb | 76/25 |
| 3,718,799 | 2/1973 | Sawamura et al. | 219/77 |
| 3,766,354 | 10/1973 | Bierwith | 219/77 |
| 3,800,633 | 4/1974 | Funakubo | 76/112 |
| 3,882,594 | 5/1975 | Jackson et al. | 228/122 |
| 4,306,139 | 12/1981 | Shinozaki et al. | 219/77 X |

Primary Examiner—James M. Meister
Attorney, Agent, or Firm—Chernoff, Vilhauer, McClung, Birdwell & Stenzel

[57] ABSTRACT

Wear-resistant and shock-resistant tools are constructed by preforming carbide-containing working parts of high wear resistance and hardness and attaching them to a softer base metal of the tool by means of a highly shock-resistant steel-to-steel fusion weld. The working part is preformed by powdered metallurgy techniques utilizing steel powders having carbide-forming constituents therein which form carbides along the grain boundaries of the steel uniformly throughout the working part as a result of sintering of the compressed powders. Thereafter the fusion welding process renders the carbide structure of the working part nonuniform for optimum shock resistance, without reducing the effective wear resistance thereof, while also forming a highly shock-resistance joint between the working part and the base metal of the tool.

11 Claims, 3 Drawing Figures

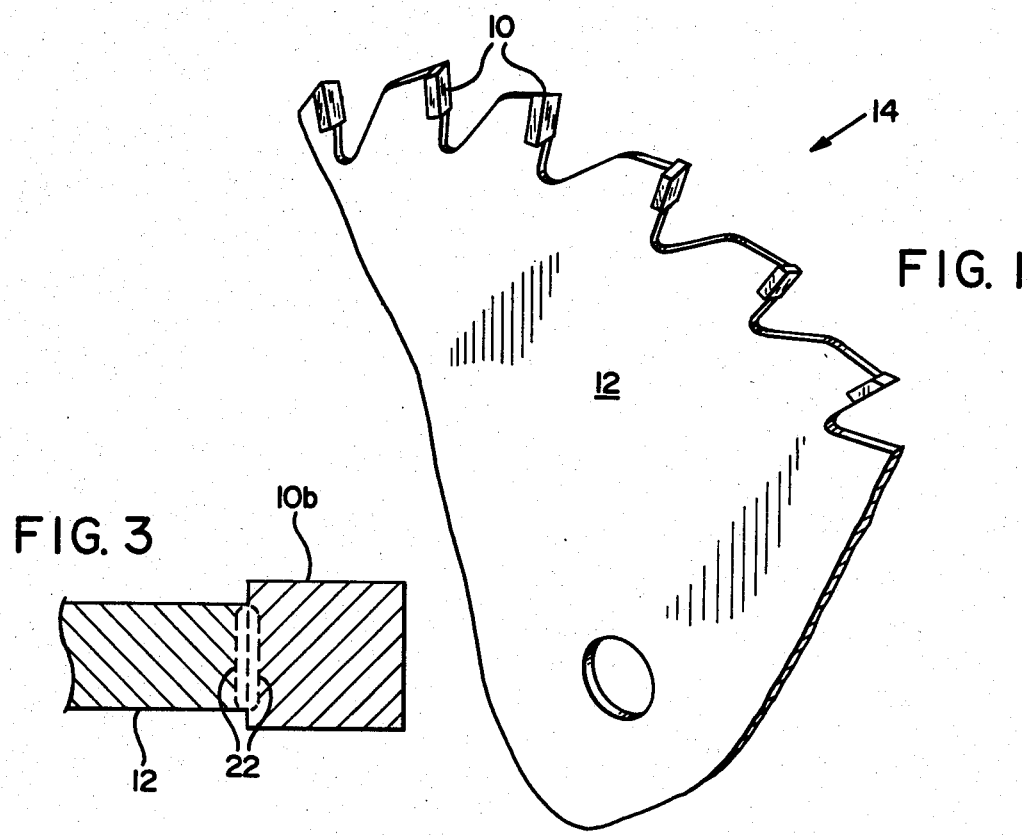
FIG. 1
FIG. 3
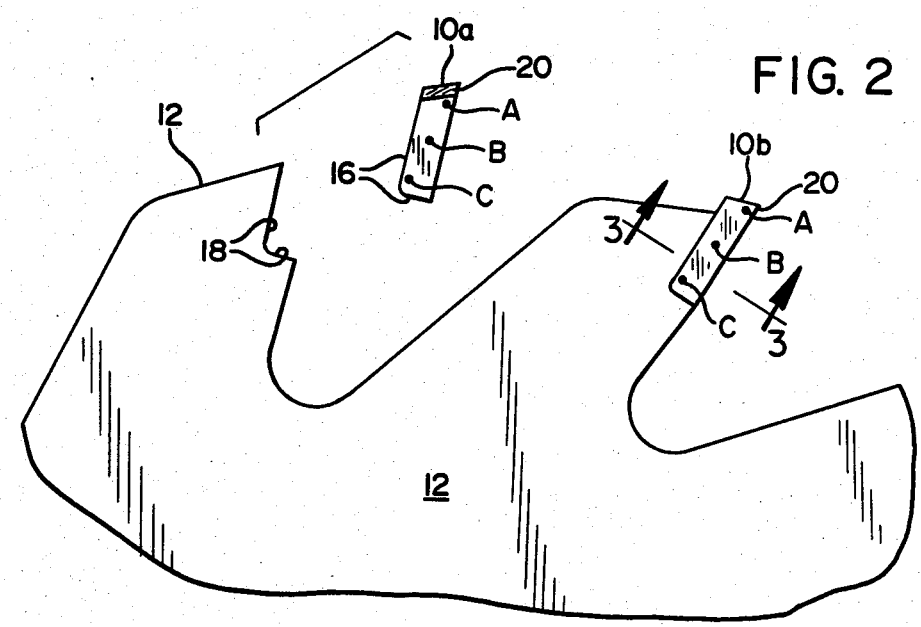
FIG. 2

WEAR-RESISTANT AND SHOCK-RESISTANT TOOLS AND METHOD OF MANUFACTURE THEREOF

BACKGROUND OF THE INVENTION

This invention relates to tools whose application requires that they exhibit a high degree of resistance both to wear and to shock loading. Such tools include many types of cutting, drilling, boring, scraping, and excavating tools, such as sawblades, scraper blades, router bits, drill bits, boring bits and excavating blades and teeth.

More particularly, the invention relates to improvements in the attachment of carbide-containing metal working parts of high wear resistance to the less wear-resistant base metal of the tool. The improved attachment is of such a strong and tough character as to prevent separation of the carbide-containing working part from the base metal of the tool even under conditions of high shock loading and high working temperature which have caused such separation in prior tools. No significant degree of wear resistance of the working part is sacrificed as a result of the improvement, and the cost of manufacture of the tool is reduced considerably thereby.

It has long been known that high wear resistance of working parts such as sawblade teeth, excavating teeth, boring teeth and the like, can be obtained by forming such parts with a relatively high proportion of cemented carbide particles therein. For example Owen U.S. Pat. No. 2,833,638, and the improvements thereto suggested by Jackson et al. U.S. Pat. No. 3,882,594, disclose methods of forming such working parts from cemented carbide particles and an appropriate low-melting matrix metal, typically high in copper content, by placing a quantity of the cemented carbide particles in a refractory mold, pouring molten matrix metal around the particles and subsequently cooling the matrix metal in the mold to achieve a working part of desired shape. The matrix metal must be of a sufficiently low-melting type to avoid melting of the carbide cementing material (usually cobalt, iron or nickel) during molding and during the subsequent attachment of the working part to the base metal of the tool. Unfortunately, the temperature limitations imposed by the presence of the cemented carbide make it extremely difficult to obtain a sufficiently shock-resistant attachment between the working part and the base metal of the tool. The low-melting matrix metal by which the working part is attached to the base metal of the tool, and the necessarily brazed or soldered joint between the two, are of insufficient toughness to reliably prevent the eventual separation of at least some of the wear-resistant parts from the remainder of the tool under the high-impact and high-temperature operating conditions usually encountered in the application of such tools.

A slightly different, but comparable, use of cemented carbide working parts is exemplified by the tools and methods of manufacture shown in Kolesh U.S. Pat. Nos. 2,880,768 and 3,104,562, Anderson U.S. Pat. No. 3,034,378, Kolb U.S. Pat. No. 3,295,396, Sawamura et al. U.S. Pat. No. 3,718,799, and Funakubo U.S. Pat. No. 3,800,633. In all of these disclosures, working parts of cemented carbide preformed by economical powdered metallurgy processes are soldered or brazed to a less wear-resistant base metal of a tool, or are attached thereto by the type of "welding" wherein only the base metal of the tool undergoes any melting, the cemented carbide being brought only to its plastic deformation or forging temperature before the two parts are pressed together because of the above-described temperature limitations imposed by the cemented carbide. This likewise creates an insufficient bond, between the wear-resistant working part and the base metal of the tool, to reliably prevent separation under expected high-impact and high-temperature working conditions.

The above-described problem of separation of cemented carbide working parts from the remainder of the tool is recognized particularly in Connoy U.S. Pat. No. 3,063,310 and to a lesser extent in Replogle U.S. Pat. No. 2,683,923 and Rayniak et al. U.S. Pat. No. 3,241,228. To solve this problem, these patents employ true fusion-type welding processes (i.e. where both the working part and the base metal of the tool undergo melting) to attach the working part to the tool. However, in order to enable the employment of such fusion-type welding, such systems abandon the extraordinary wear resistance afforded by carbide particles and also abandon the economical use of powdered metallurgy as a means to preform the working part accurately and completely prior to its attachment to the base metal of the tool. Accordingly, not only is wear resistance of the working part sacrificed, but once the working part is attached to the tool it must then be shaped by appropriate cutting or grinding processes, thereby also adding greatly to the cost of manufacture of the tool.

What is needed, therefore, is a tool and method of manufacture thereof in which the use of carbide particles in working parts for maximum wear resistance, and the use of economical powdered metallurgy techniques to preform the working part prior to its attachment in order to minimize manufacturing cost, are somehow made compatible with the employment of a highly shock-resistant, fusion-type steel weld attachment of the working part to the base metal of the tool (i.e. a weld wherein two steel surfaces are melted and diffused into each other).

SUMMARY OF THE INVENTION

The present invention renders compatible the aforementioned competing objectives of high wear resistance, high shock resistance, and low manufacturing cost.

Low manufacturing cost is obtained in two ways. First, the working part is preformed by the use of economical powdered metallurgy procedures which include compressing metal powders under extremely high pressure to the desired shape and then sintering the compressed metal powders to bond them together; accordingly, when the working part is ultimately attached to the base metal of the tool, little or no further costly shaping is required because of the accuracy of the powdered metal shaping technique. Second, significant additional cost savings are obtained by the elimination of soldering or brazing materials and the reduction of inspection and cleanup costs associated therewith, and reduction of powder costs for reasons to be explained hereafter.

In order to render compatible the remaining two objectives of wear resistance and shock resistance, the powdered metallurgy technique employed in the present invention does not utilize the same powdered materials as have been used in the past in preforming cemented carbide working parts, nor does the technique of the present invention produce a cemented carbide part. Instead of a conventional mixture of powdered carbides and powdered metallic cement such as cobalt, the powdered metal utilized to form the working part in the present invention is primarily powdered steel containing carbide-making constituents. If desired, some carbide powder for additional carbide loading may be mixed with the steel powder, but this is not critical. Powdered high-speed steels containing carbon and one or more elements such as tungsten, vanadium, molybdenum and chromium which readily form carbides with the carbon when in close proximity therewith under the influence of heat, can be obtained on the market with compositions standardized by the steel industry and identified by a letter such as M or T followed by a numeral.

As a result of the compression of such a powdered steel, having carbide-making constituents therein, and the subsequent sintering thereof to bond the powders together by heat and resultant fusion thereof into the preformed shape of the working part, carbide particles are formed from the constituents along the grain boundaries of the steel. Such carbides are thus desirably agglomerated within the steel to enhance wear resistance, but without being cemented together by a metallic cement whose melting temperature prevents the subsequent use of fusion welding to attach the working part to the base metal of the tool. Rather the carbide particles are held in the working part by a high-speed steel readily attachable by fusion welding to the softer base steel of the tool such that an extremely shock-resistant bond can be formed between the working part and the base metal of the tool.

Equally important, it has been determined that the compression of steel powders and subsequent sintering thereof to produce the carbide structure in the working part does not produce an objectionable coarse-grain structure characteristic of as-cast high-speed steel. Rather a highly desirable fine-grain structure is produced which contains desirable agglomerations of carbide particles along the grain boundaries which enhance the wear resistance of the working part.

During the subsequent fusion welding process whereby mutually-abutting portions of both the base steel of the tool and the compressed bonded steel powders of the working part are melted to diffuse them into each other to create a true fusion-type weld, a further desirable phenomenon occurs. The carbide structure, in the minor fraction of the powdered steel of the working part which is melted in the fusion welding process, is eliminated as a result of the heat of fusion. This renders the portion of the working part at the junction with the base metal of the tool less hard and brittle than the cutting or working edge or surface of the working part, the latter remaining substantially unaffected by the fusion welding process and therefore retaining its desirable wear-resistant carbide structure. The elimination of the carbide structure in the portion of the working part close to the weld joint, although making the working part less wear-resistant in this area, renders it more shock-resistant by reducing its brittleness near the joint, thereby enabling it to withstand higher impact loading without internal fracture. The reduction of wear resistance in this area of the working part is of no consequence, since this area is not the portion of the working part employed for cutting or other applications where wear resistance is needed.

Accordingly, it can be seen that the invention satisfies all three of the above-mentioned objectives in a consistent manner. Low manufacturing cost is not only preserved by complete preforming of the working part by economical powdered metallurgy techniques, but is actually improved by the elimination of all soldering and brazing materials and the costly cleanup and inspection associated therewith, and the substantial replacement of carbide powders with less costly high-speed steel powders.

Wear resistance is preserved by the presence of a carbide structure in the working part, at least at its cutting or other working surfaces where needed, even though such carbide structure does not include conventional cemented carbides.

And, finally, shock resistance is obtained by providing fusion-type, steel-to-steel weldability of the working part to the base steel of the tool by the replacement of cemented carbides in the working part with compressed, bonded steel powder having carbide particles formed along the grain boundaries thereof. Not only does such fusion welding prevent separation of the working part from the base metal of the tool under high-impact and/or high-temperature loading, but it also renders the working part itself more resistant to internal fracture by creating a hardness and brittleness gradient within the working part whereby the portions thereof closer to the weld joint are less brittle, and thus more shock-resistant, than are the cutting or working portions of the working part. Since the working part is usually cantilevered from the weld joint outwardly to the working surface thereof, the highest stresses in the working part will normally exist in the area of the weld joint, and the hardness or brittleness gradient created in the working part thus appropriately corresponds to the expected stress gradient within the working part.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a perspective view of a portion of an exemplary tool constructed in accordance with the present invention, i.e. a circumferential portion of a circular sawblade showing several teeth with working parts in the form of cutting teeth attached thereto.

FIG. 2 is an enlarged side view of two teeth of the sawblade of FIG. 1, one tooth having an unmounted cutting tip about to be inserted into proper welding position and the other tooth having a cutting tip attached to it by fusion welding, both tips being constructed in accordance with the present invention.

FIG. 3 is an enlarged sectional view taken along line 3—3 of FIG. 2.

DETAILED DESCRIPTION OF THE INVENTION

The circular sawblade depicted in the figures is merely one example of the various types of tools described above requiring high degrees of wear resistance and shock resistance to which the present invention is applicable. FIG. 1 depicts a multiplicity of working parts 10, in this case cutting tips, of relatively hard and wear-resistant character attached to the steel body 12 of a circular sawblade 14, the body 12 being of different composition and lesser hardness and wear resistance than the cutting tips 10.

The cutting tips 10 (i.e. working parts) are preformed to their desired shape by well-known powdered metallurgy techniques which include compressing and shaping metallic powders under high pressure in a die having the shape of the working part, removing the compressed, shaped powders from the die and thereafter sintering the compressed powders under vacuum in a furnace to bond them together by heat, followed by normal quenching of the parts for optimum hardness. The metal powder size is in the same range as that normally employed in conventional powdered metallurgy processes and is not critical.

The powders used are preferably of M-2 or M-3 high-speed steel, but may alternatively be of other high-speed steels such as those whose chemistries are listed in Connoy U.S. Pat. No. 3,063,310 which is incorporated herein by reference. Each of these steels contains a relatively high carbon content together with relatively high contents of other carbide-forming constituents including vanadium, tungsten, molybdenum and chromium, one or more of which will combine with the carbon to form carbides during sintering. Steels having other carbide-forming constituents may also conceivably be used, such as those containing titanium, tantalum, zirconium, uranium, and/or columbium. The amounts of the various carbide constituents in the steel powders may be variable depending upon the desired ultimate uniform carbide content of the working part, which in turn depends on the balance between shock resistance and wear resistance appropriate for the particular application of the tool. Ultimate carbide content of the working part may be increased to a point in excess of that which would result from the carbide-forming constituents, if desired, by uniformly mixing some carbide powder with the steel powders prior to compression thereof. Preferably, the ultimate carbide content of the working part will be less than 50% by weight of the part, and it is believed that best results will be obtained when the percent of carbide is less than 30% by weight of the part, so as to have enough steel content in the working part to optimize the steel-to-steel fusion-welded joint with the base metal of the tool.

By way of example, the M-2 steel of which the powder may be composed for sawblade cutting tip purposes has a composition by weight substantially as follows: carbon—0.85 to 0.95%; silicon—0.4 to 0.6%; manganese—0.2 to 0.45%; tungsten—6.25 to 6.75%; chromium—3.9 to 4.4%; molybdenum—4.7 to 5.3%; vanadium—1.7 to 2.1%; iron—balance. It will be noted that the carbide constituents of M-2 steel, i.e. carbon, tungsten, chromium, molybdenum and vanadium, form slightly less than 20% by weight of the steel. Alternative steels with higher percentages of carbide constituents would tend to result in greater wear resistance and brittleness and less shock resistance and flexibility of the working part, but may of course be more suitable for applications where impact loading on the working part is less than that encountered in the use of a circular sawblade.

The foregoing parameters are to be contrasted with previously-known working parts composed of cemented carbides, where the carbide content is generally substantially greater than 50% by weight, usually in the 80% range.

During the sintering process the steel powders, which have been compressed to the desired shape of the working part, are heated in a vacuum furnace to fuse and thereby bond the steel powders together. Under the sintering conditions of heat and close proximity, the carbide constituents readily form carbide particles which move to the grain boundaries of the steel uniformly throughout the working part. The resultant grain structure is desirably fine and randomly oriented due to the use of the powdered metallurgy process, as opposed to the undesirable coarse grain structure of as-cast steel of the same composition.

After sintering, the working part is preferably annealed and heat-treated in a vacuum to prevent surface oxide deposits which could interfere with an optimum weld and is then fusion-welded in air by any conventional and convenient means, such as electrical resistance welding, to the base steel of the tool which is usually of a much softer composition.

In FIG. 2, a cutting tip 10a formed according to the present invention is shown in the process of being placed in abutment with a first tooth of the circular body 12 of the sawblade 14. The mating faces 16 and 18 respectively of the two parts can be merely opposing flat surfaces, or they can be of a more complex shape to give a greater bearing surface area to the joint. The mating faces are locally heated, as mentioned above, by a conventional welding technique to bring both of them to a melting temperature so that the materials of the mating faces will diffuse into each other forming an alloy of the two dissimilar metals. This area of mutual diffusion of the two metals is indicated at 22 in FIG. 3 with respect to tip 10b of the second tooth shown in FIG. 2.

It should be noted that tip 10a as shown in FIG. 2 in a condition prior to fusion welding, and tip 10b in a condition subsequent to fusion welding, do not have the same internal structures due to changes caused by the fusion welding process. As previously stated, the distribution of carbides throughout the cutting tip 10a, as a result of the sintering process, is substantially uniform. Thus the hardness and brittleness of the cutting tip 10a at the exemplary points A, B and C, respectively (FIG. 2) are the same. This is not, however, the case with respect to the cutting tip 10b subsequent to the fusion welding process. It has been found that the fusion welding process, due to its melting of a minor fraction of the compressed, bonded steel powders in the working part (without thereby melting the major fraction of such powders), effectively eliminates the previously-formed carbides in the area of the working part adjacent to the weld diffusion area 22 (e.g. at point C) without thereby eliminating the carbides from portions of the working part which are more remote from the weld area, such as at points B and A. Thus, as a result of the fusion welding, the composition, hardness and brittleness of the working part 10b is no longer uniform. Rather a hardness gradient is thereby established in the working part 10b, such that point C is the least hard and brittle, point A is the most hard and brittle, and the hardness and brittleness of point B is between that of points A and C respectively. This is a desirable result, since the hardness, and thus wear resistance, of the cutting edge 20 of the working part is preserved while the hardness and brittleness of those portions of the working part closer to the weld area are gradually reduced, thereby correspondingly increasing their resistance to impact loads. This is appropriate since the stress from loading of the working part would also generally increase in a direction toward the weld joint.

Of course the steel-to-steel fusion-welded joint itself is also far more resistant to impact loading than a comparable soldered or brazed joint which joins the working part and the base metal of the tool merely by a principle of adhesion rather than a principle of mutual diffusion. The increased resistance to internal fracture of the working part itself, and the increased resistance to separation of the joint between the working part and the base metal of the tool, afforded by the present invention is highly significant under shock-loading and or high-temperature operating conditions such as those which may be caused by too rapid advancement of the sawblade through the material being cut, or the collision between a cutting tip and an obstruction in or near the material being cut. This advantage is achieved without significant sacrifices with respect to wear resistance of the working part, and with substantial cost savings over all of the previously-described tools and methods of manufacture due to the lesser expense of the steel powders in comparison to cemented carbide powders, the elimination of soldering and brazing materials, and the reduction of costs in connection with inspection and cleanup of the joint. The ability to sharpen and resharpen the working parts using ordinary Carborundum wheels rather than diamond wheels is a further cost-saving advantage.

EXAMPLE

Circular sawblade cutting tips of the type shown in FIGS. 1, 2 and 3 of dimensions approximately 0.25 inches long, 0.110 inches wide and 0.060 inches thick (i.e. parallel to the thickness dimension of the sawblade when attached thereto) were preformed by compressing M-2 high-speed steel powders in a die having the shape of the cutting tip at a pressure of 30–40 tons per square inch. The powders, compressed to shape, were then sintered in a vacuum furnace at a temperature between 2,250° F. and 2,350° F. to bond the powders together. The sintered cutting tips were quenched to ambient temperature, then annealed, then heated to slightly below sintering temperature and quenched again, all in a vacuum, after which the tips were fusion-welded in air to the circular body of a circular sawblade composed of AISI-SAE 1018 steel. The fusion welding was performed by a Black & Webster Model 503-4-274-02 electrical resistance welder having its positive electrode attached to the cutting tip and its negative electrode attached to the body of the sawblade. In the welding process, each tip was held against a respective tooth of the sawblade during a total holding period of ⅜ of a second with a force of approximately 150 lbs. During the first half of this holding period, 5.8 kW of electric power were applied over a period of 1/5 second between the electrodes thereby melting and diffusing abutting portions of both the cutting tip and the tooth into each other, such electrical heating energy being sufficient to melt only a minor fraction of the compressed and bonded steel powders in the cutting tip. This was followed by air cooling of the weld joint to solidify it and thereby fix the two parts together while the tip continued to be forcibly held against the tooth for the remainder of the holding period. Photomicrographic study of the resultant weld and cutting tip revealed a crackfree weld and a substantial elimination of carbides in the cutting tip in the area immediately adjacent the weld, although the tooth of the sawblade body retained its carbon structure. However sections of the cutting tip closer to the cutting edge and more remote from the weld area showed definite retention of the carbide formation outlining the grain boundaries in these sections. Tests with a superficial hardness tester revealed full hardness in the area of the cutting edge, with a gradual reduction in hardness closer to the weld joint corresponding to the reduction in carbides near the weld joint.

The terms and expressions which have been employed in the foregoing specification are used therein as terms of description and not of limitation, and there is no intention by the use of such terms and expressions of excluding equivalents of the features and processes shown and described or portions thereof, it being recognized that the scope of the invention is defined and limited only by the claims which follow.

What is claimed is:

1. A tool comprising:
    (a) a wear-resistant working part formed of steel powders, containing carbide-forming constituents, compressed into a preformed shape and bonded together by heating and containing carbide particles therein formed from said carbide-forming constituents of said steel powders;
    (b) a body of steel in abutment with said working part, said body of steel having a different composition of lesser hardness than said working part; and
    (c) a portion of said working part, constituting a minor fraction of said compressed and bonded steel powders, and an abutting portion of said body being fixedly fused with each other by melting and diffusion into each other of both of said portions while in abutment with each other, and subsequent cooling thereof.

2. The tool of claim 1 wherein said carbide particles are formed from said carbide-forming constituents along grain boundaries of said compressed and bonded steel powders of said working part.

3. The tool of claim 1 wherein said carbide particles are distributed nonuniformly through said working part, the concentration of said carbide particles adjacent the junction between said working part and said body of steel being less than the concentration of carbide particles remote from said junction.

4. The tool of claim 1, 2 or 3 wherein said carbide particles form less than 50% by weight of said working part.

5. The tool of claim 1, 2 or 3 wherein said carbide particles form less than 30% by weight of said working part.

6. A process for manufacturing a tool comprising:
    (a) preforming a wear-resistant working part by compressing steel powders having carbide-forming constituents therein into a preformed shape and bonding said powders together in said shape by heating thereof;
    (b) abutting a portion of said working part against a mating portion of a body of steel having a different composition of lesser hardness than said working part;
    (c) during said abutment, applying heat to the abutting portions of said working part and said body respectively sufficient to melt and diffuse into each other both of said respective abutting portions, but insufficient to melt a major fraction of said compressed and bonded steel powders in said working part; and (d) cooling the diffused portions of said working part and said body and thereby fixedly fusing said respective portions to each other.

7. The process of claim 6, further including forming carbide particles from said carbide-forming constituents along grain boundaries of said compressed and bonded steel powders of said working part.

8. The process of claim 6, further including forming carbide particles from said carbide-forming constituents nonuniformly through said working part such that the concentration of said carbide particles adjacent the junction between said working part and said body of steel is less than the concentration of carbide particles remote from said junction.

9. The process of claim 6 further including, prior to step (a), mixing carbide powders with said steel powders.

10. The process of claim 6, 7, 8 or 9 wherein said working part has carbide particles therein forming less than 50% by weight of said working part.

11. The process of claim 6, 7, 8 or 9 wherein said working part has carbide particles therein forming less than 30% by weight of said working part.

* * * * *